United States Patent [19]

Wishner

[11] 4,007,709
[45] Feb. 15, 1977

[54] APPARATUS AND PROCESS FOR RAISING LOBSTERS

[76] Inventor: Frederick B. Wishner, 30 E. 40th St., New York, N.Y. 10016

[22] Filed: Mar. 24, 1975

[21] Appl. No.: 561,089

[52] U.S. Cl. .................................................. 119/2
[51] Int. Cl.² ...................................... A01K 61/00
[58] Field of Search .................................. 119/2–5

[56] References Cited
UNITED STATES PATENTS

| | | | |
|---|---|---|---|
| 3,499,421 | 3/1970 | MacDonald et al. | 119/2 |
| 3,693,591 | 9/1972 | Stasio | 119/3 |
| 3,741,159 | 6/1973 | Halaunbrenner | 119/2 |
| 3,815,546 | 6/1974 | Plante | 119/2 |

Primary Examiner—Russell R. Kinsey
Assistant Examiner—Peter K. Skiff
Attorney, Agent, or Firm—Robert L. Stone

[57] ABSTRACT

Post-larval lobsters are raised to a size for marketing in a series of divided trays suitable for stacking and having therein a hollow tube in the center of the trays. Small holes are present on the wall of the hollow tube, the dividers in the trays and the floors of the trays. A pressure pump can be inserted in the hollow tube to aerate the water and to feed the lobsters by pumping air and food from the pump to pass through the holes.

15 Claims, 9 Drawing Figures

APPARATUS AND PROCESS FOR RAISING LOBSTERS

This invention relates to an apparatus and process for raising lobsters from post-larval size to at least a size at which they are suitable for marketing.

It has been difficult to raise lobsters in substantial numbers under controlled circumstances, particularly in a natural environment, due to their cannibal nature. Separation is therefore necessary.

It is an advantage of this invention that an apparatus is provided in which a plurality of post-larval young lobsters, typically a fraction of an inch in size and a few grams in weight, are grown to a marketable size of at least about 1 pound.

It is a further advantage of this invention that a process is provided in which a plurality of post-larval young lobsters are grown to a marketable size.

It is a further advantage of this invention that a plurality of young lobsters can be raised keeping several lobsters on a single level with several levels being present one stacked over another, with means provided for feeding the lobsters in a substantially uniform manner.

It is a further advantage of this invention that a plurality of young lobsters can be raised in optimum underwater conditions, including natural seawater environment.

Other advantages of this invention will be apparent from consideration of the following specification.

Accompanying this specification are drawings which illustrate exemplary embodiments of this invention.

Figure 1:
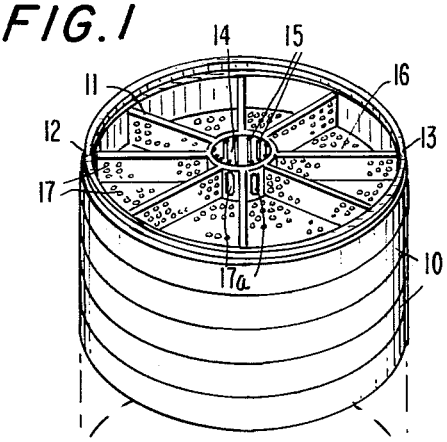
FIG. 1 is a side perspective view of a stack of cylindrical trays suitable for the raising of post-larval lobsters.

In accordance with certain of its aspects this invention relates to a lobster raising apparatus comprising at least one sectioned tray, each tray having a hollow tube passing through the center thereof; the sections of each tray being divided by walls which prevent growing lobsters from migrating from one section to another; there being a plurality of holes in said hollow tube and said divider walls and the floors of each tray of a size too small to permit post-larval and larger lobsters to pass therethrough. The covering for each tray may be another tray stacked thereover or a lid particularly on the top tray in a stack.

In accordance with additional of its aspects this invention relates to a process for maintaining and raising lobsters comprising placing a plurality of post-larval lobsters underwater in a sectioned tray in a lobster raising apparatus, one lobster in a section, said apparatus comprising at least one sectioned tray, each tray having a hollow tube passing through the center thereof; the sections of each of the said trays being divided by walls which prevent growing lobsters from migrating from one section to another; placing a pressure device in said hollow tube; withdrawing said pressure device from said hollow tube as pressure is applied to expel air; and passing bubbles of said air through holes in said hollow tube and in said divider walls and the floors of said trays which holes are too small to permit passage therethrough of said post-larval and larger lobsters thereby permitting the water enveloping each of said lobsters to be suitably aerated.

In accordance with further aspects of this invention the pressure device also may contain finely divided particles of lobster diet. As pressure is applied and the device is withdrawn from the hollow tube, the particles are expelled from the pressure device and pass with the air through the holes in the hollow tube into each of the sections of each tray to thereby feed all lobsters with substantially the same diet.

Lobsters are of a suitable size for growing in the sectioned trays when they reach the post-larval stage and are still quite small, being well under 1 inch in size such as about ½ inch, and just a few grams of weight. They may be grown to a marketable size of several inches, such as 6–10 inches or more and 1–2 pounds or more in the sectioned trays.

If desired, separate means with differently sized sectioned trays may be used, the smaller for initially growing the post-larval lobsters and the larger for growing them when they reach a substantial size of typically about 3 to 4 inches.

Desirably, the apparatus is maintained in natural seawater conditions suitable for lobster growth. Since lobsters may thrive best at moderate water temperature such as about 68°–75° F, the temperature may be left at ambient conditions in an appropriate climate or artificially maintained with a heater or cooler if desired.

Further references to the figures illustrate specific aspects of the invention.

Figure 2:
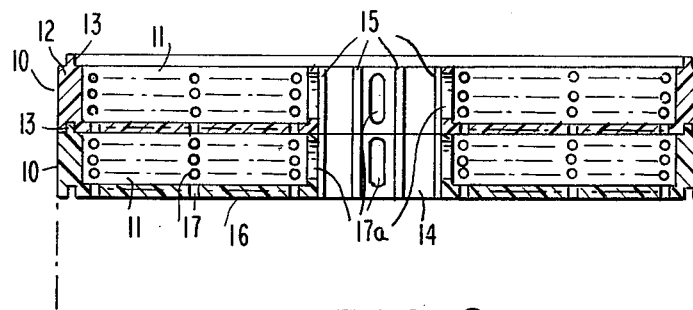
FIG. 2 is a cross section of a cylindrical tray showing the tongue in groove stacking of trays.

FIGS. 1 and 2 depict a stack of circular trays 10. The trays are suitably made of plastic although other materials such as metal may be used. A stack contains at least two trays, preferably two to about twenty and most probably about six to about sixteen. Each tray in the stack contains a plurality of dividers 11. There are at least two sections, say two to about eight and most probably about six to about eight. Preferably, as depicted more specifically in FIG. 2, the upper surfaces of the boundary wall 12 and the dividers of each tray have raised tongues 13 which are adapted to fit into grooves or depressions in the lower surface of the tray above it. As an alternative, the upper surfaces of the lower boundary wall and of the dividers of each tray may be grooved to receive tongues from the lower surface of the tray above it.

Figure 3:
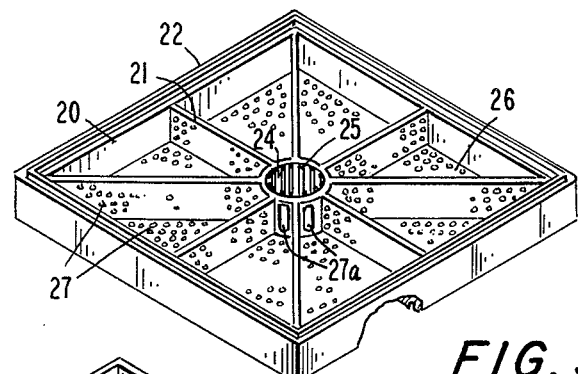
FIG. 3 is a perspective view of a square tray which may be used as an alternative to the cylindrical tray.

A hollow tube 14 is present in the center of the trays. A plurality of small holes 17 are present on the divider walls and the floors 16 of the trays. Holes which are typically slightly larger 17a are present on the wall of the hollow tube 14, particularly between ridges 15 on the inside of the hollow tube 14. Holes 17a may be circular, or as depicted elongated. All holes 17 and 17a are too small for the post-larval lobster to pass therethrough. A typical hollow tube hole 17 diameter is about 1/16 inch to about 3/16 inch, preferably about ⅛ inch and a typical hole 17a diameter is about ⅛ inch to about ¼ inch, preferably about 3/16 inch. When holes 17a are elongated the diameters may be about ⅛ inch to about ¼ inch and about 5/16 inch to about 7/16 inch. The holes 17 and 17a permit easy flow of water through the apparatus as well as a homogeneous distribution of air and food during aeration and feeding. The ridges 15 are preferably present on the inside of the hollow tube 14 as a guide for a pressure pump which can be inserted in the hollow tube 14. Preferably the ridges 15 are close to the circumference of holes 17a. The top tray is typically covered (not shown) with a lid to prevent the lobsters therein from escaping. The cover may be plastic and may have holes therein similar to the floor holes in the trays. FIG. 3 depicts a square tray 20 which may be used as an alternative to the circular tray 10 of FIG. 1. The upper surfaces of the divider walls 20 and the boundary wall 22 also preferably have raised tongues or depressed grooves. To facilitate stacking, the hollow tube 24 is again present in the center of the tray and small holes 27 and 27a for water, air and food distribution of similar size to the holes in the circular tray are present on the wall of the hollow tube 24, the divider walls 21, the floor 26 of the rectangular tray 20. Ridges 25 are preferably present on the inside of the hollow tube 24 to facilitate use of a pressure pump.

Figure 4:
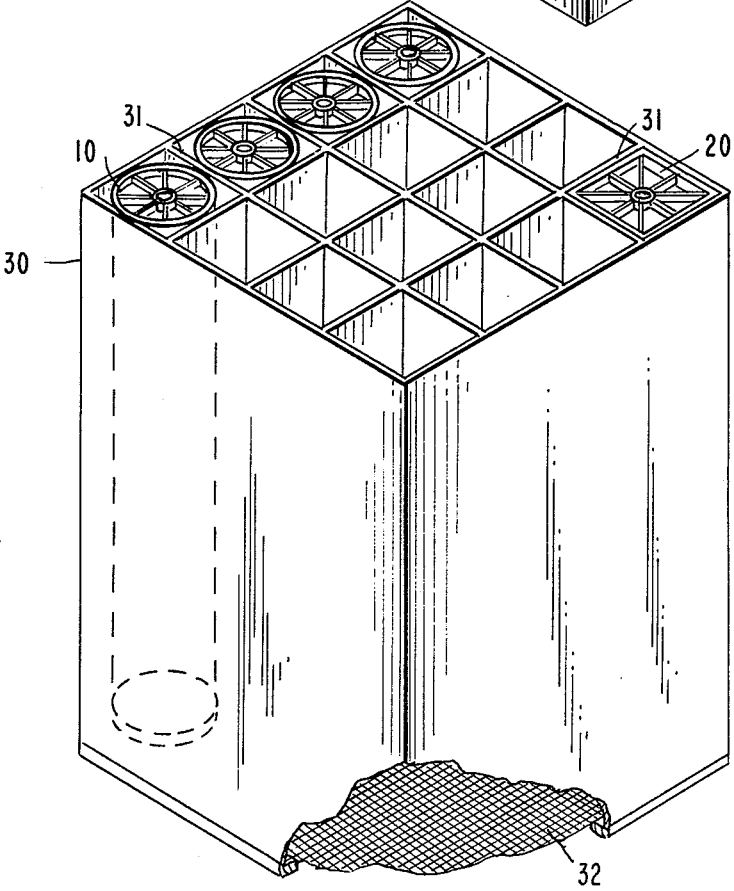
FIG. 4 is a perspective view of a cubed drum holding a series of stacked trays.

FIG. 4 depicts a cubed drum 30 in which stacks of trays circular 10 or square 20 can be aligned in drum sections 31. Suitably the bottom of the drum is a plastic mesh 32 to stabilize the stacks of trays 10 and 20 against falling. Covers for stacks of trays 10 and 20 are not shown.

Figure 5:
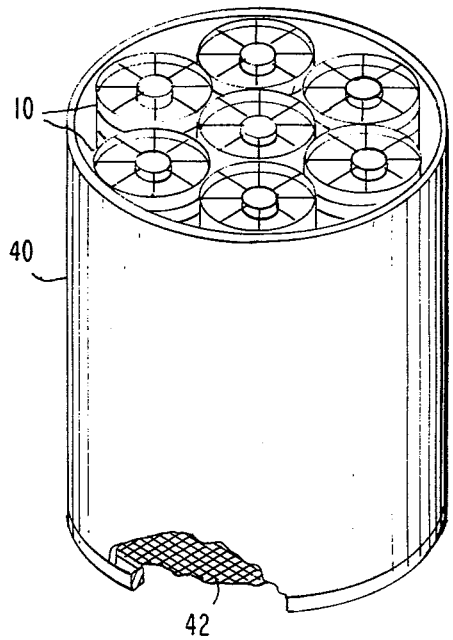
FIG. 5 is a perspective view of a cylindrical box holding a series of stacked trays.

FIG. 5 depicts a cylindrical box 40 in which stacks of circular trays 10 are suitably mounted on a plastic mesh 42. The covers for the stacks of trays 10 are not shown.

Figure 6:
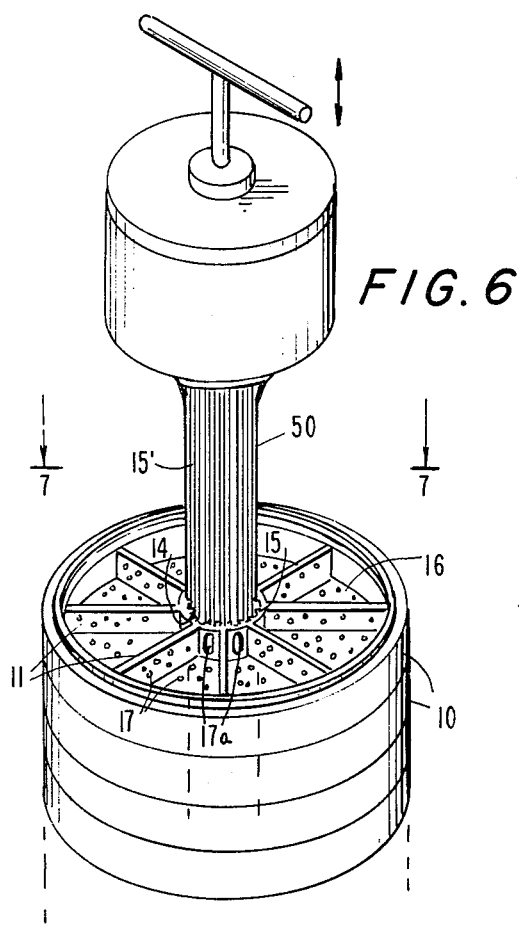
FIG. 6 is a side perspective view of a stack of trays having inserted in the hollow tube thereof a feeding and aeration pump.
Figure 7:
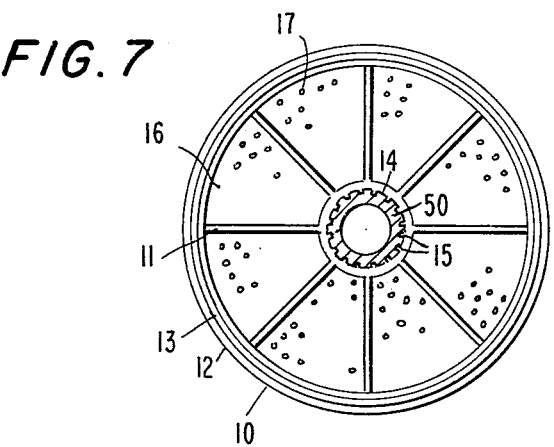
FIG. 7 is a top plan view from 7 - 7 of FIG. 6 of a tray having a feeding and aeration pump inserted in the hollow tube of the tray.

FIGS. 6 and 7 depict a stack of cylindrical trays 10 which has inserted in the hollow tube 14 thereof a pressure pump 50 the body of which is preferably grooved 15' to engage or ride in the ridges 15 which are preferably on the inside wall of the hollow tube 14 to stabilize the pump when it is inserted into a stack of trays 10. When pressure is applied to the pump 50, which is typically a rotary vane vacuum pump or similar standard type pump, air is forced through the small holes 17a and 17 which are present on the wall of the hollow tube 14, the divider walls 11 and floors 16 to aerate the water surrounding the lobsters in the trays. Suitably, small pasty food granules just smaller than the size of the ridge holes 17a and preferably too large to pass through the divider wall and floor holes 17 are typically made in a spaghetti making machine and incorporated into the pump 50 and forced through the ridge holes 17a in a premeasured amount as the pump 50 is gradually withdrawn from the stacked trays. When the size of the food paste granules is between the diameter of the ridge holes 17a and that of slightly smaller divider wall and floor holes 17, the granules can be retained in each tray section.

When the lobsters are first able to be placed in the apparatus they are just past the larval stage. Since at this point in their lives they do not require much space for growth, the tray system employed may be quite small. A small tray having eight sections may be but about 4 to about 6 inches in diameter. As the lobsters get bigger it is appropriate to move them into trays with larger sections. However, a single set of trays with large sections can be adequately used from the very beginning.

Figure 8:
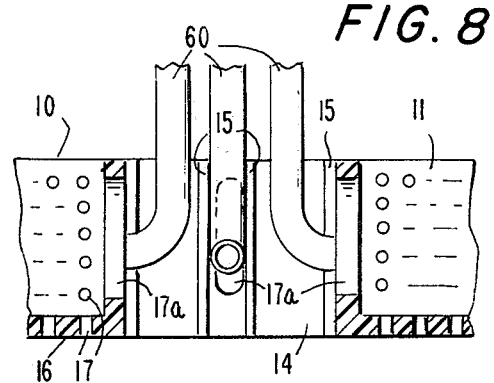
FIGS. 8 and 9 are respectively interior side and schematic top plan views of discharge ends of an alternate type of pump in contact with holes between ridges in the hollow tube of a tray leading to compartments of a tray through which the food will enter.
Figure 9:
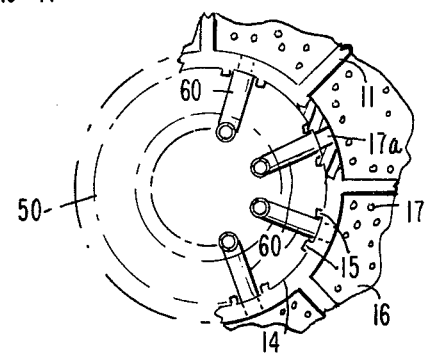

FIGS. 8 and 9 illustrate an aspect of the invention showing the discharge end of a pump with an alternate type of discharge means. More specifically, the pump may have a multiplicity of discharge ends 60, each of which ride in the ridges 15 of the hollow tube 14 which is in the center of the tray 10 the floor of which is indicated as 16 and a divider wall of which is indicated as 11.

At least one hole 17a is present within each ridge 15 of the hollow tube 14 of each tray 10, the side arcs of holes 17a being close to the ridges 15. The pump discharge ends 60 are arced and have orifices about the same size as the holes 17a. As pressure is applied to the pump, and the pump is gradually withdrawn from a stack of trays, the contents of the pump, air, and and preferably also food, are expelled through the holes 17a into each section of each tray in substantially equivalent amounts. Food typically remains on the floors 16 of the trays 10, as holes 17 are smaller than the food particles.

Further equivalent apparatuses and methods will be apparent to those skilled in the art from the foregoing disclosure.

I claim:

1. A lobster raising apparatus comprising at least one covered sectioned tray, each tray having a single hollow aeration and feeding tube passing therethrough, which hollow tube passes through the center of each tray; the sections of each tray being divided by walls which prevent growing lobsters from migrating from one section to another; there being a plurality of holes in said hollow tube and said divider walls and the floors of each tray of a size too small to permit post-larval and larger lobsters to pass therethrough, there being present in said tube a pressure device for introducing air and finely divided particles of lobster diet through said holes in said hollow tube and into said sections of each tray.

2. The lobster raising apparatus claimed in claim 1 wherein a plurality of trays are stacked one upon another.

3. The lobster raising apparatus claimed in claim 2 wherein two to about twenty trays are present in said stack.

4. The lobster raising apparatus claimed in claim 1 wherein each of said trays is divided into two to about eight sections.

5. The lobster raising apparatus claimed in claim 1 wherein each of said trays is circular.

6. The lobster raising apparatus claimed in claim 1 wherein each of said trays is square.

7. The lobster raising apparatus claimed in claim 1 wherein ridges are present on the inside of said hollow tube.

8. The lobster raising apparatus claimed in claim 7 wherein the holes in said hollow tube are in said ridges and are slightly larger than the holes in the walls and the floors of each tray.

9. A process for maintaining and raising lobsters comprising placing a plurality of post-larval lobsters underwater in a sectioned tray in a lobster raising apparatus, no more than one lobster in a section, said apparatus comprising at least one sectioned tray, each tray having a single hollow tube passing therethrough, which hollow tube passes through the center of each tray; the sections of each tray being divided by walls which prevent growing lobsters from migrating from one section to another; placing a feeding and aeration pressure device in said hollow tube withdrawing said pressure device from said hollow tube as pressure is applied to expel air; and passing bubbles of said air through holes in said hollow tube and in said divider walls and the floors of said trays which holes are too small to permit passage therethrough of said post-larval and larger lobsters thereby permitting the water enveloping each of said lobsters to be suitably aerated.

10. The process for maintaining and raising lobsters claimed in claim 9 wherein said pressure device contains finely divided particles of lobster diet and as the pressure is applied, said particles are expelled from said pressure device and pass with the air through the holes in said hollow tube into each section of each of the sectioned trays to thereby feed all of said lobsters with substantially the same diet.

11. The process for maintaining and raising lobsters claimed in claim 9 wherein said pressure device is guided in said hollow tube on ridges and is gradually withdrawn from said hollow tube as the pressure is applied.

12. The process for maintaining and raising lobsters claimed in claim 9 wherein a plurality of trays are stacked one upon another.

13. The process for maintaining and raising lobsters claimed in claim 9 wherein each of said trays is divided into two to about eight sections.

14. The process for maintaining and raising lobsters claimed in claim 11 wherein said ridges are positioned near the side arcs of the holes which enter into each section of each tray and said pressure device has a multiplicity of discharge ends, comprising positioning a discharge end in each set of ridges and discharging the contents of the pressure device through each ridge hole between the ridges as the discharge end passes each ridge hole while the pressure device is withdrawn from said hollow tube as pressure is applied.

15. The process for maintaining and raising lobsters claimed in claim 14 wherein said contents of the pressure device include food paste granules.

* * * * *